June 20, 1972  E. WIEDEKING  3,671,129
GRAPHITE TUBE SPECTROSCOPY SAMPLE CELL INCLUDING
ILLUMINATION AND OBSERVATION STRUCTURE
Filed Jan. 12, 1971

INVENTOR.
*Elmar Wiedeking*
BY
*Daniel B. Levinson*
ATTORNEY.

United States Patent Office 3,671,129
Patented June 20, 1972

3,671,129
GRAPHITE TUBE SPECTROSCOPY SAMPLE CELL INCLUDING ILLUMINATION AND OBSERVATION STRUCTURE
Elmar Wiedeking, Sipplingen am Haslrain, Germany, assignor to Bodenseewerk Perkin-Elmer & Co., GmbH, Uberlingen (Bodensee), Germany
Filed Jan. 12, 1971, Ser. No. 105,916
Claims priority, application Germany, Feb. 11, 1970, G 70 04 574.8
Int. Cl. G01j 3/02
U.S. Cl. 356—85     2 Claims

ABSTRACT OF THE DISCLOSURE

A known graphite tube cell apparatus used for heating an atomic absorption sample includes an outer housing within which the heated graphite tube is completely enclosed (except for the open ends of the tube), both to maintain the non-oxidizing protective gas on the surfaces of the graphite tube to avoid its being oxidized at the high temperatures used to dissociate the sample, and to contain the radiation from the red-hot graphite tube when so heated. Because of the closed and opaque nature of the housing, it is difficult to introduce the sample into a small inlet opening in the graphite tube. A hollow attachment on and extending through the outer housing is provided, in which a light source is contained for illuminating the sample inlet opening. The end of the attachment remote from the cell is sealed, and the inlet for the protective gas extends through the wall of the attachment at a position between the light source and the other end near the cell so as also to cool the lamp when the cell is heated. A visual observing device is preferably provided on and extending through the housing, the axis of which also intersects the sample inlet, so that the user may conveniently see this inlet when introducing the sample.

---

Figure 1:
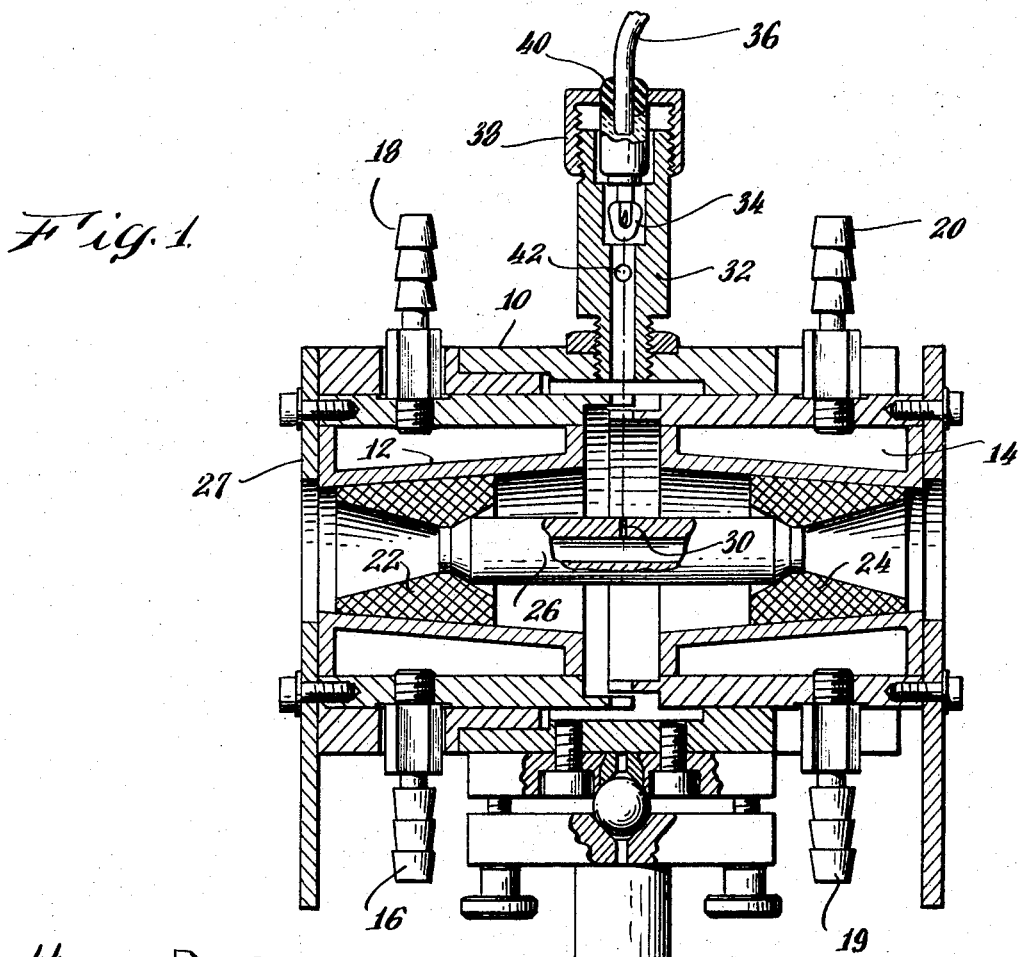

This invention relates to a sample cell for absorption spectrometers comprising a graphite tube which is mounted in a housing between two electrodes for the supply of a strong heating current, and further comprising a connection for introduction of a protective (i.e., non-oxidizing) gas into the housing. In particular, the invention concerns providing means, including a light source, for allowing observation of the graphite tube sample cell and in particular the sample inlet therein when the cell is within the housing for assisting in introducing the sample into the cell prior to heating of the cell. Such graphite tube sample cells, capable of reaching extremely high temperatures subsequent to sample introduction are especially useful in atomic absorption spectroscopy, where it is desired to both vaporize and dissociate at least the tested element or elements into individual atoms.

In atomic absorption spectrometers, the sample under analysis has conventionally been injected into a burner flame in solution, in which dissociation of the sample substances into the individual atoms is effected. Through this flame is passed a light beam emitted from a selectively emitting light source which contains one or several resonant lines of the tested element (see, for example, the U.S. Pat. 2,847,899, issued to A. Walsh).

It is prior art to introduce the sample instead into a graphite tube through which a very strong heating current of, for instance, 500 amperes is supplied. The graphite sample tube is thereby heated to very high temperatures (on the order of 2,000° C.), thereby causing vaporization of the sample and a dissociation of the sample substances into the individual atoms. The light beam of the atomic absorption spectrometer is directed through the graphite sample tube in a longitudinal direction. For introduction of (e.g., liquid) samples into the graphite tube, a small aperture is provided in the latter. The graphite sample tube or cell is arranged in a housing into which a protective (i.e., non-oxidizing) gas such as nitrogen, is introduced. This protective gas introduced into the housing is effective to prevent the graphite tube from being burnt at the high temperatures utilized. The graphite tube cell must be shielded by the housing as far as possible so as to be contained in a light-tight manner with respect to the environment, since the cell lights up very brightly when the strong current is passed therethrough. The shielding also is necessary because of the requirement of keeping the consumption of protective gas within tolerable limits. The introduction of the sample into the cell, however, takes place when the tube is cold (and therefore dark) so that it is difficult to find the sample inlet opening of the graphite tube in the dark housing. When providing lighting for the interior of the housing, the difficulty is encountered that the light source must be protected against the strong heat development of the graphite tube when the same is heated, which may, for instance, readily cause a glow lamp to burst.

It is an object of this invention to provide a graphite tube cell of the type indicated previously within an opaque housing with a light source for illuminating the graphite tube, and in such a manner that the light source will not be damaged by the heat of the heated graphite tube cell during subsequent sample measuring.

According to the invention this object is attained by providing a hollow attachment on the housing, extending radially with respect to the elongated graphite tube and containing a light source for illuminating the graphite tube (or at least the sample inlet portion thereof), which attachment is sealed (at the end thereof remote from the housing) and has a protective gas inlet, positioned on the side of the light source toward the graphite tube.

In this arrangement according to the invention the light source attachment is therefore combined with the protective gas inlet for the housing. The light source is mounted in the attachment outside of the housing, whereby a better cooling is attained. Moreover, cooling of the light source is effected by the constantly incoming cold protective gas.

Preferably, the axis of the attachment is directed towards a sample inlet opening of the graphite tube cell, and furthermore there is provided a visual observing device on the housing, the visual (optical) axis of which is also aligned with respect to this point (i.e., the sample inlet in the graphite tube).

Figure 2:
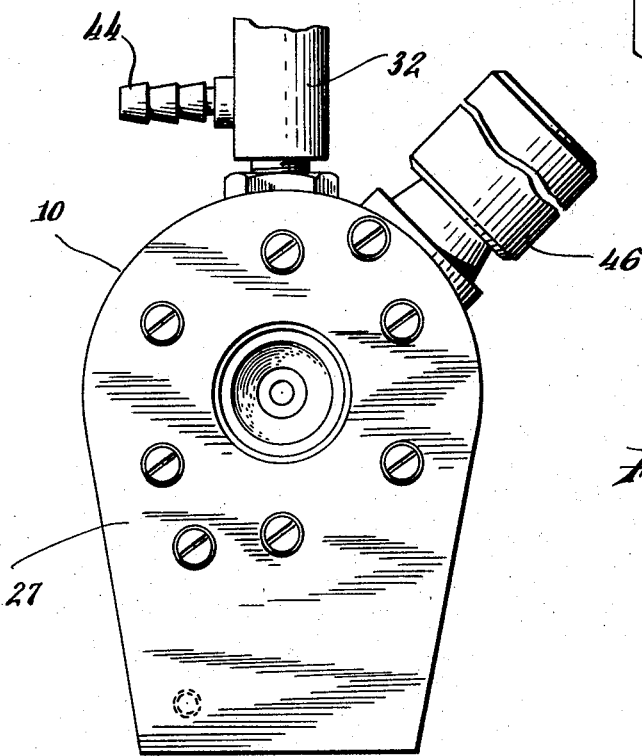

An illustrative embodiment of this invention will now be described in greater detail with reference to the accompanying drawings, in which:

FIG. 1 is a longitudinal section through a graphite tube cell including its housing as modified in accordance with the invention; and FIG. 2 is a side elevation of the same apparatus as seen from the right in FIG. 1.

The graphite tube cell apparatus according to the invention comprises a housing 10 in which are mounted a pair of cooling jackets 12, 14. The cooling jackets are basically ring-shaped and are arranged coaxially with respect to each other. Through cooling water connections 16, 18, and 19, 20, respectively, cooling water is passed through the cooling jackets 12 and 14. In each of the cooling jackets 12 and 14, one of the two electrodes 22 and 24, respectively, is disposed. The graphite tube 26 into which the sample is introduced is supported between the electrodes. Sheet bars 27, 28 mounted to the cooling jackets 12, 14, are respectively connected to opposite sides of an electrical energy source, as by heavy-current plug-connectors (not illustrated).

The graphite tube 26 is provided at its longitudinal center with a sample inlet opening 30. A sleeve-shaped attachment 32 is mounted to the housing with its axis radially aligned with the sample inlet. As can best be seen from FIG. 1, this attachment 32 contains a light source in the form of a glow lamp 34 the current cable 36 for which extends from the outwardly extending end of the attachment 32. The light source 34 with the lead-in cable 36 is supported within the attachment by a screw cap 38 and a seal 40 so that the attachment 32 is sealed relative to the environment (air) outside of the housing 10.

A gas inlet 42 for the protective (non-oxidizing) gas is provided in the side wall of the attachment on the side of the light source 34 nearer the graphite tube 26. This protective gas inlet 42 communicates with a protective gas connecting socket 44 extending perpendicularly relative to the attachment 32. Through the connecting socket 44 and the inlet 42, the protective gas (e.g., nitrogen) is introduced into the housing 10. The protective gas passes by the light source 34 thereby cooling it, so that the light source 34 is prevented from being overheated when the graphite tube 26 is heated up. The protective gas flows into the housing 10 and around the graphite tube 26. It also enters the interior of the graphite tube through the sample inlet opening 30 and from there flows to the ends of the graphite tube 26, discharging into the atmosphere. In this manner constantly circulating protective gas flows over the entire (interior and exterior) surfaces of the graphite tube so that even at the high temperatures reached (on the order of 2,000° C.) the graphite tube will not be burnt.

As can best be seen from FIG. 2, there is provided a visual observing device 46 on the housing 10, the line of sight (i.e., optical axis) of which is also directed towards the sample inlet opening 30. Therefore, it is possible prior to passage of the current through the graphite tube 26, thus, when the tube (and therefore the interior of the housing 10 in general) is still dark, to illuminate the sample inlet opening 30 by means of the light source 34 and observe the opening 30 by means of the observing device 46. In this manner, introduction of the sample through opening 30 into the tubular cell 26 is substantially facilitated.

It is claimed:

1. In a graphite tube cell apparatus of the type used with atomic absorption spectrometers comprising a graphite tube cell which is mounted within a housing between two electrodes for the supply of a strong heating current, and further comprising a connection for introduction of a protective gas into the housing, the improvement comprising:
   a hollow attachment mounted on said housing and extending radially with respect to said graphite tube cell;
   said attachment being sealed at its end remote from said cell;
   a light source contained within said housing for illuminating said graphite tube;
   and a protective gas inlet communicating with the interior of said hollow attachment at a position nearer to said graphite tube than said light source.

2. An improved graphite tube cell apparatus as claimed in claim 1, in which:
   the axis of said attachment is directed towards the sample inlet opening of said graphite tube;
   and a visual observing device is provided on said housing, the axis of said observing device also being aligned with respect to said sample inlet opening,
   whereby an observer may inspect said sample inlet opening as illuminated within said housing thereby greatly facilitating sample introduction into said sample inlet opening.

References Cited

Woodriff, R. and Ramelow, G.: "Atomic Absorption Spectroscopy with a High-temperature Furnace"; Spectrochimica Acta, vol. 23B, pp. 665–671, 1968.

RONALD L. WIBERT, Primary Examiner

O. B. CHEW II, Assistant Examiner

U.S. Cl. X.R.

356—244